US010517016B2

(12) United States Patent
Seo

(10) Patent No.: US 10,517,016 B2
(45) Date of Patent: Dec. 24, 2019

(54) METHOD FOR DETERMINING SIZE OF TRANSMISSION BLOCK OF UPLINK SIGNAL IN WIRELESS COMMUNICATION SYSTEM AND APPARATUS THEREFOR

(71) Applicant: LG ELECTRONICS INC., Seoul (KR)

(72) Inventor: Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/743,927

(22) PCT Filed: Jul. 15, 2016

(86) PCT No.: PCT/KR2016/007731

§ 371 (c)(1),
(2) Date: Jan. 11, 2018

(87) PCT Pub. No.: WO2017/018703

PCT Pub. Date: Feb. 2, 2017

(65) Prior Publication Data

US 2018/0270707 A1 Sep. 20, 2018

Related U.S. Application Data

(60) Provisional application No. 62/196,311, filed on Jul. 24, 2015, provisional application No. 62/291,510, filed on Feb. 4, 2016.

(51) Int. Cl.
*H04W 28/06* (2009.01)
*H04W 72/08* (2009.01)
(Continued)

(52) U.S. Cl.
CPC ............... *H04W 28/06* (2013.01); *H04L 1/00* (2013.01); *H04L 1/1854* (2013.01);
(Continued)

(58) Field of Classification Search
CPC ..... H04W 28/02; H04W 28/06; H04W 72/02; H04W 72/08; H04W 72/12
See application file for complete search history.

(56) References Cited

U.S. PATENT DOCUMENTS

2009/0135769 A1* 5/2009 Sambhwani .......... H04L 5/0053 370/329
2011/0237289 A1* 9/2011 Fodor ................. H04W 52/367 455/522

(Continued)

FOREIGN PATENT DOCUMENTS

WO WO 2011/082744 A2 7/2011
WO WO 2014/088294 A1 7/2011

(Continued)

*Primary Examiner* — Rina C Pancholi

(74) *Attorney, Agent, or Firm* — Birch, Stewart, Kolasch & Birch, LLP

(57) ABSTRACT

A method for transmitting, by a terminal, a high-speed uplink signal to a base station in a wireless communication system is disclosed. Specifically, the method for transmitting a high-speed uplink signal comprises the steps of: setting a plurality of resource blocks as a resource pool for transmitting a high-speed uplink signal through an upper layer signal; selecting at least one resource block from the resource pool; and transmitting the high-speed uplink signal including a transmission block on the selected resource block to a base station, wherein the size of the transmission block is determined on the basis of the number of the selected resource blocks.

10 Claims, 7 Drawing Sheets

Set resource pool composed of plurality of RBs — S701

Select one or more RBs from resource pool and determine TB size — S703

Transmit determined TB size through high-speed uplink signal on selected RBs — S705

(51) Int. Cl.
*H04L 1/00* (2006.01)
*H04L 5/00* (2006.01)
*H04W 74/08* (2009.01)
*H04L 1/18* (2006.01)

(52) U.S. Cl.
CPC ........... *H04L 5/0044* (2013.01); *H04W 72/08* (2013.01); *H04W 74/0833* (2013.01)

(56) References Cited

U.S. PATENT DOCUMENTS

2011/0310820 A1* 12/2011 Liao ...................... H04L 1/1614
370/329
2013/0182654 A1* 7/2013 Hariharan ............. H04W 52/54
370/329
2015/0071099 A1* 3/2015 Yi ........................ H04B 7/2656
370/252
2015/0173060 A1* 6/2015 Ge .......................... H04W 4/70
370/252
2015/0319776 A1* 11/2015 Seo ..................... H04W 74/002
370/329
2018/0020365 A1* 1/2018 Xiong ............... H04W 74/0833

FOREIGN PATENT DOCUMENTS

WO WO 2013/157872 A1 10/2013
WO WO-2013157872 A1 * 10/2013 ........... H04B 7/2656
WO WO-2014088294 A1 * 6/2014 .......... H04W 74/002

* cited by examiner ( a ) CONTROL-PLANE PROTOCOL STACK ( b ) USER-PLANE PROTOCOL STACK

METHOD FOR DETERMINING SIZE OF TRANSMISSION BLOCK OF UPLINK SIGNAL IN WIRELESS COMMUNICATION SYSTEM AND APPARATUS THEREFOR

CROSS REFERENCE TO RELATED APPLICATIONS

This application is the National Phase of PCT International Application No. PCT/KR2016/007731, filed on Jul. 15, 2016, which claims priority under 35 U.S.C. 119(e) to U.S. Provisional Application No. 62/196,311, filed on Jul. 24, 2015 and No. 62/291,510, filed on Feb. 4, 2016, all of which are hereby expressly incorporated by reference into the present application.

TECHNICAL FIELD

The present invention relates to a wireless communication system, and more particularly, to a method for determining a transport block size of an uplink signal in a wireless communication system and apparatus therefor.

BACKGROUND ART

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

DISCLOSURE OF THE INVENTION

Technical Task

Based on the above discussion, the present invention proposes a method for determining a transport block size of an uplink signal in a wireless communication system and apparatus therefor.

Technical Solutions

In an aspect of the present invention, provided herein is a method of performing a random access, including: a method for transmitting a high-speed uplink signal to an evolved node B (eNB) by a user equipment (UE) in a wireless communication system, including: setting a plurality of resource blocks (RBs) as a resource pool for transmitting the high-speed uplink signal through a higher layer signal; selecting one or more RBs from the resource pool; and transmitting, to the eNB, the high-speed uplink signal including a transport block (TB) on the selected RBs, wherein a size of the TB may be determined based on the number of the selected RBs.

In another aspect of the present invention, provided herein is a user equipment (UE) in a wireless communication, including: a wireless communication module for transmitting and receiving signals through a network; and a processor for processing the signals, wherein the processor may be configured to set a plurality of resource blocks (RBs) as a resource pool for transmitting a high-speed uplink signal through a higher layer signal, select one or more RBs from the resource pool, and control the wireless communication module to transmit the high-speed uplink signal including a transport block (TB) on the selected RBs to an evolved node B (eNB), and wherein a size of the TB may be determined based on the number of the selected RBs.

Preferably, the number of RBs that can be selected from the resource pool may be set through the higher layer signal.

Additionally, maximum transmission power of the high-speed uplink signal may be determined based on the number of the selected RBs. In addition, when a response signal is received in response to the high-speed uplink signal from the eNB, resources for receiving the response signal may be determined based on the number of the selected RBs.

More preferably, the one or more RBs may be selected based on channel quality between the UE and the eNB.

More preferably, a ratio of the TB size to a maximum TB size corresponding to the resource pool may correspond to a ratio of the number of the selected RBs to the number of RBs included in the resource pool.

Advantageous Effects

According to the present invention, a UE can determine a transport block size for uplink transmission in an efficient manner.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BEST MODE FOR INVENTION

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

Figure 1:
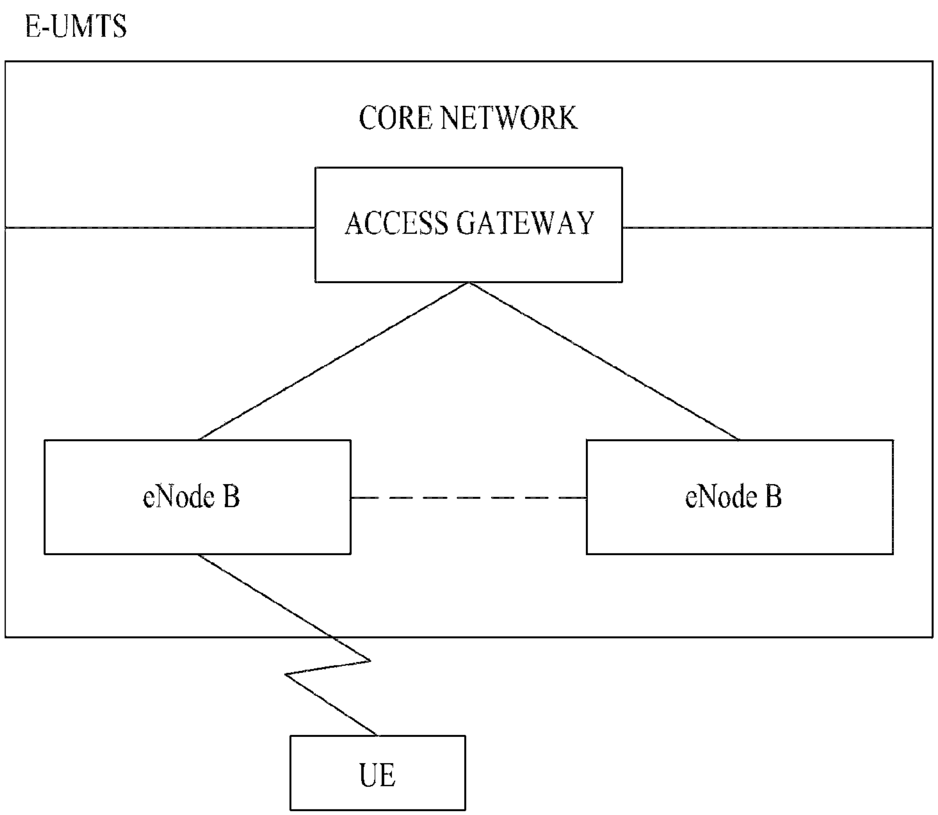
FIG. 1 is a diagram schematically illustrating a network structure of an evolved universal mobile telecommunications system (E-UMTS) as an exemplary radio communication system.
Figure 2:
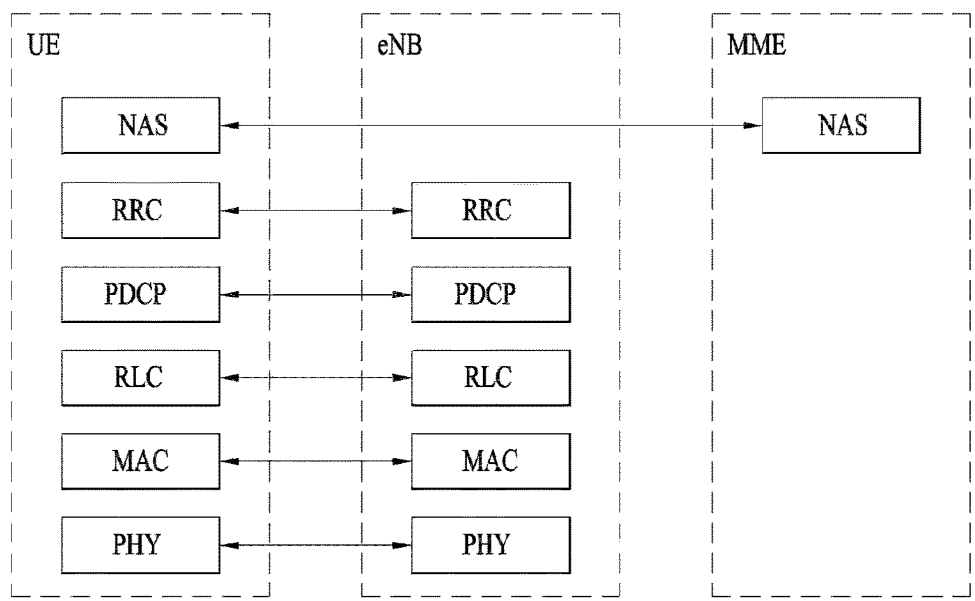
FIG. 2 is a diagram illustrating structures of a control plane and a user plane of a radio interface protocol between a UE and an evolved UMTS terrestrial radio access network (E-UTRAN) based on the 3GPP radio access network specification.
Figure 2:
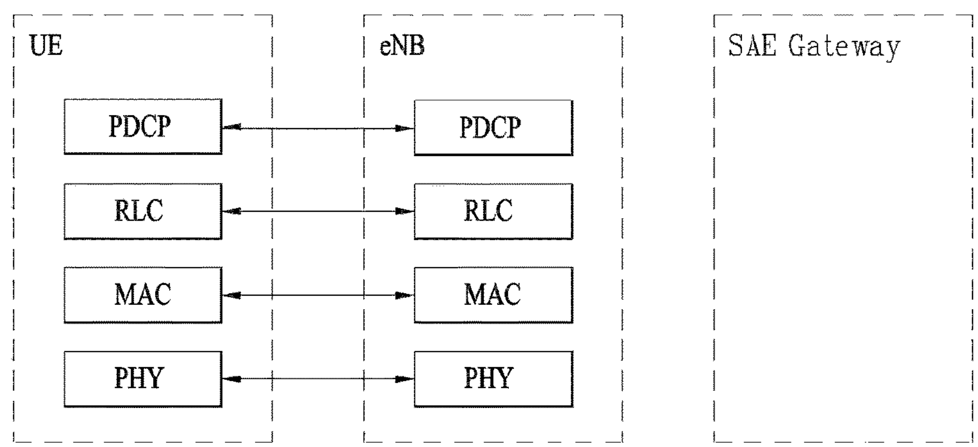

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel. Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
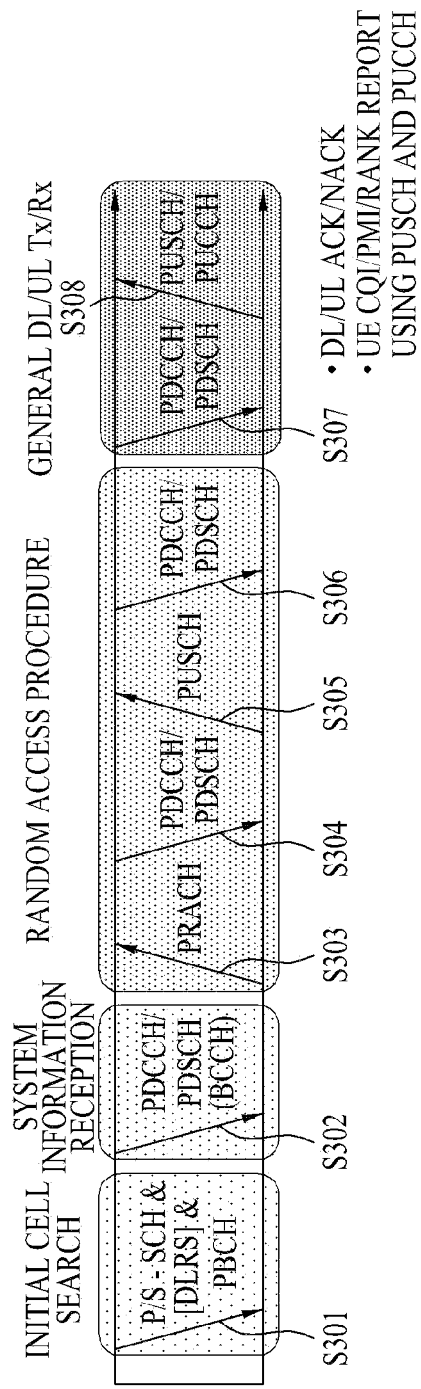
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
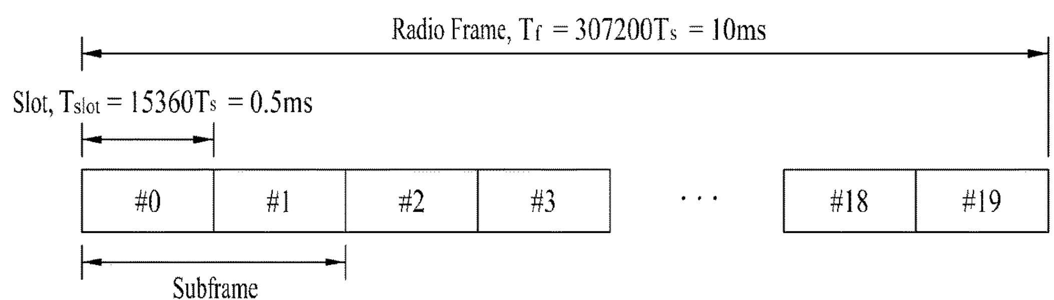
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by $Ts=1/(15\ kHz\times 2048)=3.2552\times10^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
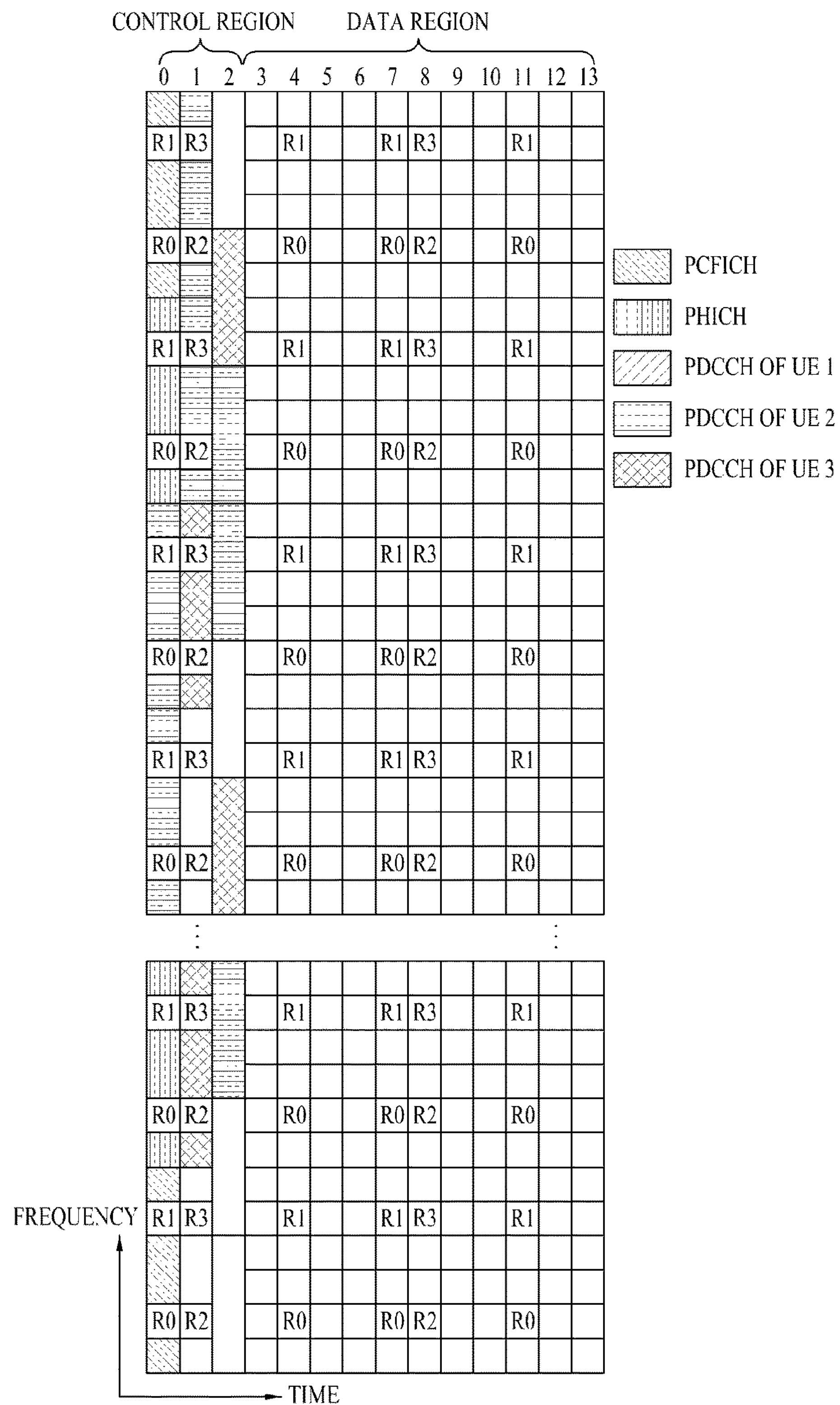
FIG. 5 is a diagram illustrating the structure of a DL radio frame used in an LTE system.

FIG. 5 is a diagram illustrating control channels contained in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
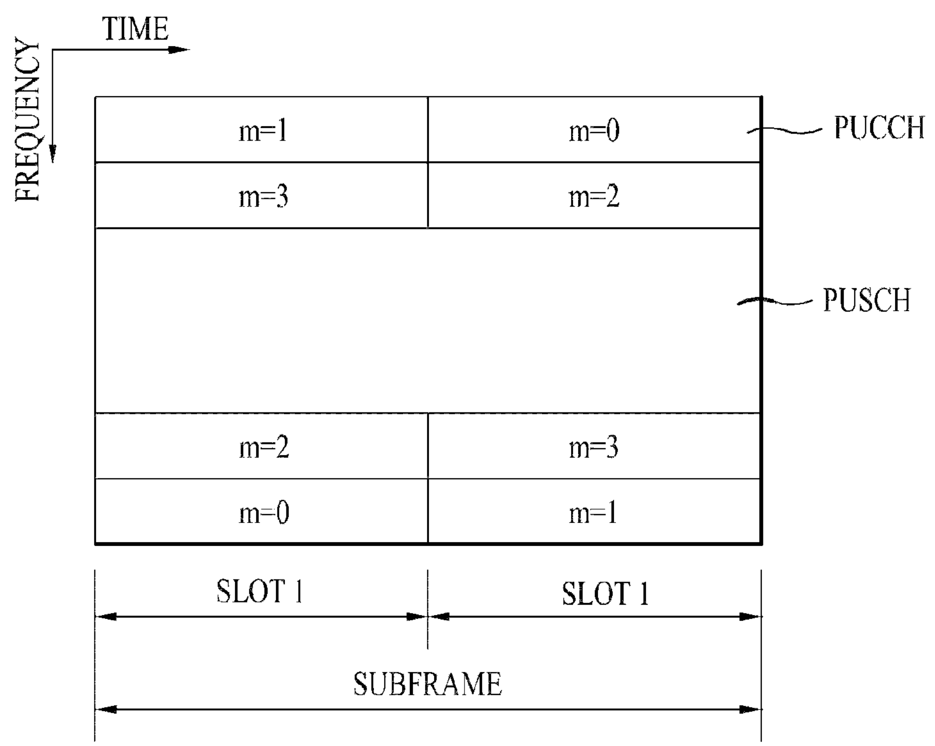
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Meanwhile, to transmit data through the PUSCH, a UE should first determine a modulation order and a transport block size, and to this end, the UE reads a modulation and coding scheme (MCS) index field (i.e., an $I_{MCS}$ field) included in downlink control information (DCI) transmitted through the PDCCH. One $I_{MCS}$ field is mapped to one modulation order, $Q_m$, one $I_{TBS}$, and one redundancy version ($rv_{idx}$) as shown in Table 1 below. Here, ITBS is one of factors determining a transport block size.

TABLE 1

| MCS Index $I_{MCS}$ | Modulation Order $Q'_m$ | TBS Index $I_{TBS}$ | Redundancy Version $rv_{idx}$ |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |
| 29 | reserved | | 1 |
| 30 | | | 2 |
| 31 | | | 3 |

In addition, a transport block size (TBS) is defined by $I_{TBS}$ and the number of allocated resource blocks, $N_{PRB}$ as shown in Table 2 below.

TABLE 2

| | $N_{PRB}$ | | | | | | | | | |
|---|---|---|---|---|---|---|---|---|---|---|
| $I_{TBS}$ | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

| | $N_{PRB}$ | | | | | | | | | |
|---|---|---|---|---|---|---|---|---|---|---|
| $I_{TBS}$ | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |

TABLE 2-continued

| | | | | | | | | | | |
|---|---|---|---|---|---|---|---|---|---|---|
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |

| | $N_{PRB}$ | | | | | | | | | |
|---|---|---|---|---|---|---|---|---|---|---|
| $I_{TBS}$ | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |

| | $N_{PRB}$ | | | | | | | | | |
|---|---|---|---|---|---|---|---|---|---|---|
| $I_{TBS}$ | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |

TABLE 2-continued

| | | | | | | | | | | |
|---|---|---|---|---|---|---|---|---|---|---|
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

| | $N_{PRB}$ | | | | | | | | | |
|---|---|---|---|---|---|---|---|---|---|---|
| $I_{TBS}$ | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |

| | $N_{PRB}$ | | | | | | | | | |
|---|---|---|---|---|---|---|---|---|---|---|
| $I_{TBS}$ | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16416 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 20616 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |

| | $N_{PRB}$ | | | | | | | | | |
|---|---|---|---|---|---|---|---|---|---|---|
| $I_{TBS}$ | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |

TABLE 2-continued

| | | | | | | | | | | |
|---|---|---|---|---|---|---|---|---|---|---|
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |

| | $N_{PRB}$ | | | | | | | | | |
|---|---|---|---|---|---|---|---|---|---|---|
| $I_{TBS}$ | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3240 | 3368 | 3368 | 3368 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 17568 | 18336 | 18336 |
| 13 | 18336 | 18336 | 19080 | 19080 | 19080 | 19848 | 19848 | 19848 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 46888 | 48936 | 48936 | 48936 | 51024 | 51024 |
| 26 | 52752 | 52752 | 55056 | 55056 | 55056 | 55056 | 57336 | 57336 | 57336 | 59256 |

| | $N_{PRB}$ | | | | | | | | | |
|---|---|---|---|---|---|---|---|---|---|---|
| $I_{TBS}$ | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 28336 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |

TABLE 2-continued

| | | | | | | | | | | |
|---|---|---|---|---|---|---|---|---|---|---|
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |

| | $N_{PRB}$ | | | | | | | | | |
|---|---|---|---|---|---|---|---|---|---|---|
| $I_{TBS}$ | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |

| | $N_{PRB}$ | | | | | | | | | |
|---|---|---|---|---|---|---|---|---|---|---|
| $I_{TBS}$ | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |

Hereinafter, a description will be given in detail of an uplink reference signal, in particular, a demodulation reference signal (DM-RS).

A reference signal sequence, $r_{u,v}^{(\alpha)}(n)$ can be defined on the basis of a basic sequence, $\bar{r}_{u,v}(n)$ and a cyclic shift (CS) value, α according to Equation 1.

$$r_{u,v}^{(\alpha)}(n)=e^{j\alpha n}\bar{r}_{u,v}(n),\ 0\le n<M_{sc}^{RS} \qquad \text{[Equation 1]}$$

In Equation 1, $M_{sc}^{RS}(1\le m\le N_{RB}^{max,UL})$ is a length of the reference signal sequence, and it satisfies the equation of $M_{sc}^{RS}=mN_{sc}^{RB}$. $N_{sc}^{RB}$ indicates a resource block size, which is expressed by the number of subcarriers in the frequency domain, and $N_{RB}^{max,UL}$ indicates the maximum value of an uplink bandwidth, which is expressed by the multiple of $N_{sc}^{RB}$. A plurality of reference signal sequences can be defined by differently applying the CS value, α to one basic sequence.

A basic sequence, $\bar{r}_{u,v}(n)$ may be divided into a plurality of groups. In this case, $u\in\{0, 1, \ldots, 29\}$ indicates a group index, and V indicates a basic sequence index within each group. The basic sequence depends on a basic sequence length ($M_{sc}^{RS}$). When m satisfies the condition of $1\le m\le 5$, each group includes one basic sequence (v=0) having the length of $M_{sc}^{RS}$. On the other hand, when m satisfies the condition of $6\le m\le n_{RB}^{max,UL}$, each group includes two basic sequences (v=0 and 1) each having the length of $M_{sc}^{RS}$. The sequence group index u and the basic sequence index within each group, V may be changed according to group hopping or sequence hopping, which will be described later.

In addition, a basic sequence with a length of $3N_{sc}^{RB}$ or longer can be defined as shown in Equation 2.

$$\bar{r}_{u,v}(n)=x_q(n \bmod N_{ZC}^{RS}),\ 0\le n<M_{sc}^{RS} \qquad \text{[Equation 2]}$$

In Equation 2, q indicates a root index of Zadoff-Chu (ZC) sequence, and $N_{ZC}^{RS}$ indicates a ZC sequence length, which can be given as the maximum prime number smaller than $M_{sc}^{RS}$. The ZC sequence having a root index of q can be defined as shown in Equation 3.

$$x_q(m)=e^{-j\frac{\pi q m(m+1)}{N_{ZC}^{RS}}},\ 0\le m\le N_{ZC}^{RS}-1 \qquad \text{[Equation 3]}$$

Additionally, q can be given according to Equation 4.

$$q=\lfloor\bar{q}+1/2\rfloor+v\cdot(-1)^{\lfloor 2\bar{q}\rfloor}$$

$$\bar{q}=N_{ZC}^{RS}\cdot(u+1)/31 \qquad \text{[Equation 4]}$$

When the length of the reference signal sequence is equal to or smaller than $3N_{sc}^{RB}$, the basic sequence can be defined as shown in Equation 5.

$$\bar{r}_{u,v}(n)=e^{j\varphi(n)\pi/4},\ 0\le n\le M_{sc}^{RS}-1 \qquad \text{[Equation 5]}$$

Tables 3 and 4 below show values of φ(n) in case of $M_{sc}^{RS}=N_{sc}^{RB}$ and $M_{sc}^{RS}=2N_{sc}^{RB}$, respectively.

TABLE 3

| u | φ(0), . . . , φ(11) | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | −3 | 3 | −3 | 1 | −1 | −1 | 3 | −1 | −3 |
| 27 | −3 | −1 | −3 | −1 | −3 | 3 | 1 | −1 | 1 | 3 | −3 | −3 |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

TABLE 4

| u | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 0 | −1 | 3 | 1 | −3 | 3 | −1 | 1 | 3 | −3 | 3 | 1 | 3 | −3 | 3 | 1 | 1 | −1 | 1 | 3 | −3 | 3 | −3 | −1 | −3 |
| 1 | −3 | 3 | −3 | −3 | −3 | 1 | −3 | −3 | 3 | −1 | 1 | 1 | 1 | 3 | 1 | −1 | 3 | −3 | −3 | 1 | 3 | 1 | 1 | −3 |
| 2 | 3 | −1 | 3 | 3 | 1 | 1 | −3 | 3 | 3 | 3 | 3 | 1 | −1 | 3 | −1 | 1 | 1 | −1 | −3 | −1 | −1 | 1 | 3 | 3 |
| 3 | −1 | −3 | 1 | 1 | 3 | −3 | 1 | 1 | −3 | −1 | −1 | 1 | 3 | 1 | 3 | 1 | −1 | 3 | 1 | 1 | −3 | −1 | −3 | −1 |
| 4 | −1 | −1 | −1 | −3 | −3 | −1 | 1 | 1 | 3 | 3 | −1 | 3 | −1 | 1 | −1 | −3 | 1 | −1 | −3 | −3 | 1 | −3 | −1 | −1 |
| 5 | −3 | 1 | 1 | 3 | −1 | 1 | 3 | 1 | −3 | 1 | −3 | 1 | 1 | −1 | −1 | 3 | −1 | −3 | 3 | −3 | −3 | −3 | 1 | 1 |
| 6 | 1 | 1 | −1 | −1 | 3 | −3 | −3 | 3 | −3 | 1 | −1 | −1 | 1 | −1 | 1 | 1 | −1 | −3 | −1 | 1 | −1 | 3 | −1 | −3 |
| 7 | −3 | 3 | 3 | −1 | −1 | −3 | −1 | 3 | 1 | 3 | 1 | 3 | 1 | 1 | −1 | 3 | 1 | −1 | 1 | 3 | −3 | −1 | −1 | 1 |
| 8 | −3 | 1 | 3 | −3 | 1 | −1 | −3 | 3 | −3 | 3 | −1 | −1 | −1 | −1 | 1 | −3 | −3 | −3 | 1 | −3 | −3 | −3 | 1 | −3 |
| 9 | 1 | 1 | −3 | 3 | 3 | −1 | −3 | −1 | 3 | −3 | 3 | 3 | 3 | −1 | 1 | 1 | −3 | 1 | −1 | 1 | 1 | −3 | 1 | 1 |
| 10 | −1 | 1 | −3 | −3 | 3 | −1 | 3 | −1 | −1 | −3 | −3 | −3 | −1 | −3 | −3 | 1 | −1 | 1 | 3 | 3 | −1 | 1 | −1 | 3 |
| 11 | 1 | 3 | 3 | −3 | −3 | 1 | 3 | 1 | −1 | −3 | −3 | −3 | 3 | 3 | −3 | 3 | 3 | −1 | −3 | 3 | −1 | 1 | −3 | 1 |
| 12 | 1 | 3 | 3 | 1 | 1 | 1 | −1 | −1 | 1 | −3 | 3 | −1 | 1 | 1 | −3 | 3 | 3 | −1 | −3 | 3 | −3 | −1 | −3 | −1 |
| 13 | 3 | −1 | −1 | −1 | −1 | −3 | −1 | 3 | 3 | 1 | −1 | 1 | 3 | 3 | 3 | −1 | 1 | 1 | −3 | 1 | 3 | −1 | −3 | 3 |
| 14 | −3 | −3 | 3 | 1 | 3 | 1 | −3 | 3 | 1 | 3 | 1 | 1 | 3 | 3 | −1 | −1 | −3 | 1 | −3 | −1 | 3 | 1 | 1 | 3 |
| 15 | −1 | −1 | 1 | −3 | 1 | 3 | −3 | 1 | −1 | −3 | −1 | 3 | 1 | 3 | 1 | −1 | −3 | −3 | −1 | −1 | −3 | −3 | −3 | −1 |
| 16 | −1 | −3 | 3 | −1 | −1 | −1 | −1 | 1 | 1 | −3 | 3 | 1 | 3 | 3 | 1 | −1 | 1 | −3 | 1 | −3 | 1 | 1 | −3 | −1 |
| 17 | 1 | 3 | −1 | 3 | 3 | −1 | −3 | 1 | −1 | −3 | 3 | 3 | 3 | −1 | 1 | 1 | 3 | −1 | −3 | −1 | 3 | −1 | −1 | −1 |
| 18 | 1 | 1 | 1 | 1 | 1 | −1 | 3 | −1 | −3 | 1 | 1 | 3 | −3 | 1 | −3 | −1 | 1 | 1 | −3 | −3 | 3 | 1 | 1 | −3 |
| 19 | 1 | 3 | 3 | 1 | −1 | −3 | 3 | −1 | 3 | 3 | 3 | −3 | 1 | −1 | 1 | −1 | −3 | −1 | 1 | 3 | −1 | 3 | −3 | −3 |
| 20 | −1 | −3 | 3 | −3 | −3 | −3 | −1 | −1 | −3 | −1 | −3 | 3 | 1 | 3 | −3 | −1 | 3 | −1 | 1 | −1 | 3 | −3 | 1 | −1 |
| 21 | −3 | −3 | 1 | 1 | −1 | 1 | −1 | 1 | −1 | 3 | 1 | −3 | −1 | 1 | −1 | 1 | −1 | −1 | 3 | 3 | −3 | −1 | 1 | −3 |

TABLE 4-continued

| u | φ(0), . . . , φ(23) | | | | | | | | | | | | | | | | | | | | | | |
|---|---|---|---|---|---|---|---|---|---|---|---|---|---|---|---|---|---|---|---|---|---|---|---|
| 22 | −3 | −1 | −3 | 3 | 1 | −1 | −3 | −1 | −3 | −3 | 3 | −3 | 3 | −3 | −1 | 1 | 3 | 1 | −3 | 1 | 3 | 3 | −1 | −3 |
| 23 | −1 | −1 | −1 | −1 | 3 | 3 | 3 | 1 | 3 | 3 | −3 | 1 | 3 | −1 | 3 | −1 | 3 | 3 | −3 | 3 | 1 | −1 | 3 | 3 |
| 24 | 1 | −1 | 3 | 3 | −1 | −3 | 3 | −3 | −1 | −1 | 3 | −1 | 3 | −1 | −1 | 1 | 1 | 1 | 1 | −1 | −1 | −3 | −1 | 3 |
| 25 | 1 | −1 | 1 | −1 | 3 | −1 | 3 | 1 | 1 | −1 | −1 | −3 | 1 | 1 | −3 | 1 | 3 | −3 | 1 | 1 | −3 | −3 | −1 | −1 |
| 26 | −3 | −1 | 1 | 3 | 1 | 1 | −3 | −1 | −1 | −3 | 3 | −3 | 3 | 1 | −3 | 3 | −3 | 1 | −1 | 1 | −3 | 1 | 1 | 1 |
| 27 | −1 | −3 | 3 | 3 | 1 | 1 | 3 | −1 | −3 | −1 | −1 | −1 | 3 | 1 | −3 | −3 | −1 | 3 | −3 | −1 | −3 | −1 | −3 | −1 |
| 28 | −1 | −3 | −1 | −1 | 1 | −3 | −1 | −1 | 1 | −1 | −3 | 1 | 1 | −3 | 1 | −3 | −3 | 3 | 1 | 1 | −1 | 3 | −1 | −1 |
| 29 | 1 | 1 | −1 | −1 | −3 | −1 | 3 | −1 | 3 | −1 | 1 | 3 | 1 | −1 | 3 | 1 | 3 | −3 | −3 | 1 | −1 | −1 | 1 | 3 |

Reference signal hopping can be applied as follows.

The sequence group index, u with a slot index of $n_s$ can be defined by a group hopping pattern, $f_{gh}(n_s)$ and a sequence shift pattern, $f_{ss}$ as shown in Equation 6.

$$u=(f_{gh}(n_s)+f_{ss})\bmod 30 \qquad \text{[Equation 6]}$$

There may be 17 different group hopping patterns and 30 different sequence shift patterns. Whether group hopping is applied may be indicated by a higher layer.

The PUCCH and PUSCH may have the same group hopping pattern. The group hopping pattern, $f_{gh}(n_s)$ can be defined as shown in Equation 7.

$$f_{gh}(n_s)=\begin{cases}0 & \text{if group hopping is disabled}\\ \left(\sum_{i=0}^{7} c(8n_s+i)\cdot 2^i\right)\bmod 30 & \text{if group hopping is enabled}\end{cases} \qquad \text{[Equation 7]}$$

In Equation 7, c(i) indicates a pseudo-random sequence corresponding to a PN sequence, and it can be defined by a length-31 Gold sequence. Equation 8 shows an example of the Gold sequence.

$$c(n)=(x_1(n+N_c)+x_2(n+N_c))\bmod 2$$

$$x_1(n+31)=(x_1(n+3)+x_1(n))\bmod 2$$

$$X_2(n+31)=(x_2(n+3)+x_2(n+2)+x_1(n+1)+x_1(n))\bmod 2 \qquad \text{[Equation 8]}$$

In this case, $N_c$ is 1600, $x_1(i)$ is a first m-sequence, and $x_2(i)$ indicates a second m-sequence. For example, the first or second m-sequence can be initialized in each SC-FDMA symbol according to a cell ID, a slot number in one radio frame, an SC-FDMA symbol index in a slot, a CP type, and the like. In addition, a pseudo-random sequence generator may be initialized to satisfy at the head of each radio frame such that the condition of $$c_{init}=\left\lfloor \frac{N_{ID}^{cell}}{30} \right\rfloor$$

is satisfied.

Moreover, the PUCCH and PUSCH may have the same sequence shift pattern. A sequence shift pattern of the PUCCH may be given as $f_{ss}^{PUCCH}=N_{ID}^{cell} \bmod 30$. A sequence shift pattern of the PUSCH may be given as $f_{ss}^{PUSCH}=(f_{ss}^{PUCCH}+\Delta_{ss})\bmod 30$, and in this case, $\Delta_{ss}\in\{0, 1, \ldots, 29\}$ may be configured by a higher layer.

Sequence hopping can be applied only to a reference signal sequence having a length greater than $6N_{sc}^{RB}$. In this case, the basic sequence index within the basic sequence group, V with a slot index of $n_s$ can be defined as shown in Equation 9.

$$v=\begin{cases}c(n_s) & \text{if group hopping is enabled and sequence hopping is enabled}\\ 0 & \text{otherwise}\end{cases} \qquad \text{[Equation 9]}$$

In this case, c(i) can be represented in the example of Equation 8, and whether sequence hopping is applied may be indicated by a higher layer. The pseudo-random sequence generator may be initialized at the head of each radio frame such that the condition of $$c_{init}=\left\lfloor \frac{N_{ID}^{cell}}{30} \right\rfloor \cdot 2^5+f_{ss}^{PUSCH}$$

is satisfied.

A DMRS sequence for the PUSCH can be defined as shown in Equation 10.

$$r_{PUSCH}(m\cdot M_{sc}^{RS}+n)=r_{u,v}^{(\alpha)}(n) \qquad \text{[Equation 10]}$$

In Equation 10, m and n satisfy the conditions of m=0,1 and n=0, . . . , $M_{sc}^{RS}-1$, respectively.

In a slot, the CS value, α can be defined as shown in Equation 11, and $n_{cs}$ can be defined as shown in Equation 12.

$$\alpha=2\pi\frac{n_{cs}}{12} \qquad \text{[Equation 11]}$$

$$n_{cs}=(n_{DMRS}^{(1)}+n_{DMRS}^{(2)}+n_{PRS}(n_s))\bmod 12 \qquad \text{[Equation 12]}$$

In Equation 12, $n_{DMRS}^{(1)}$ is indicated by a parameter transmitted from a higher layer, which is named as cyclicShift. Table 5 below shows a relationship between the parameter and $n_{DMRS}^{(1)}$.

TABLE 5

| cyclicShift | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

In Equation 12, $n_{DMRS}^{(2)}$ can be defined by a cyclic shift (CS) field in DCI format 0 for a transport block corresponding to PUSCH transmission. The DCI format is transmitted through the PDCCH. The CS field may have a 3-bit length.

Meanwhile, an orthogonal code cover (OCC) can be applied to a DMRS reference signal sequence. OCC means a code that has orthogonality and can be applied to a sequence.

Table 6 shows a relationship among the CS field, $n_{DMRS}^{(2)}$, and OCC.

TABLE 6

| Cyclic Shift Field in uplink-related DCI format [3] | $n_{DMRS,\lambda}^{(2)}$ $\lambda = 0$ | $\lambda = 1$ | $\lambda = 2$ | $\lambda = 3$ | $[w^{(\lambda)}(0)\ w^{(\lambda)}(1)]$ $\lambda = 0$ | $\lambda = 1$ | $\lambda = 2$ | $\lambda = 3$ |
|---|---|---|---|---|---|---|---|---|
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] |

If a physical downlink control channel (PDCCH) including DCI format 0 is not transmitted in the same transport block, if an initial PUSCH is semi-persistently scheduled in the same transport block, or if an initial PUSCH is scheduled by a random access response grant in the same transport block, $n_{DMRS}^{(2)}$ may become zero.

In addition, $n_{PRS}(n_s)$ can be defined as shown in Equation 13.

$$n_{PRS}(n_s)=\sum_{i=0}^{7} c(8N_{symb}^{UL}\cdot n_s+i)\cdot 2^i \quad \text{[Equation 13]}$$

In this case, c(i) can be represented in the example of Equation 8, and it can be applied in a cell-specific manner. The pseudo-random sequence generator may be initialized at the head of each radio frame such that the condition of $$c_{init}=\left\lfloor \frac{N_{ID}^{cell}}{30} \right\rfloor \cdot 2^5 + ((N_{ID}^{cell}+\Delta_{ss}) \bmod 30)$$

is satisfied.

A DMRS sequence, $r^{PUSCH}(\cdot)$ is multiplied with an amplitude scaling factor, $\beta_{PUSCH}$, and it is mapped to the sequence starting from a physical transport block used for corresponding PUSCH transmission, $r^{PUSCH}(0)$. In the case of a normal CP, the DMRS sequence is mapped to a fourth SC-FDMA symbol (i.e., SC-FDMA symbol index 3), and in the case of an extended CP, the DMRS sequence is mapped to a third SC-FDMA symbol (i.e., SC-FDMA symbol index 3).

The present invention proposes a method for enabling a UE to perform uplink transmission efficiently and rapidly even when an eNB does not directly allocate resources to each UE. In particular, the present invention can be efficiently used when uplink data needs to be transmitted with a short time delay, for example, when data including state information of a high-speed vehicle is transmitted. Moreover, according to the present invention, the same principle can be applied not only when a UE transmits data to an eNB in uplink but also when the UE directly transmits data to another UE.

In the general cellular communication, an eNB allocates resources to be used for uplink transmission to individual UEs, and uplink transmission is performed based on the resource allocation. This is because when the eNB allocates the appropriate location and amount of time/frequency/space resources to UEs by considering channel states or the amount of traffic, interference between transmission from different UEs is prevented, and thus the uplink transmission efficiency can be maximized. However, to operate based on the resource allocation for the individual UEs, the eNB needs to be connected to the UEs in advance.

That is, a UE should transmit a control signal indicating that the UE desires to be connected to the eNB and receive information on the resource allocation, and the eNB should also inform the UE of various configurations necessary for the resource allocation in response to the control signal. Specifically, a time delay occurs during such a pre-connection procedure, and in particular, in the case of data be transmitted with a short time delay, the time delay occurring during the pre-connection procedure may significantly degrade service quality.

To solve the above-described problem, a UE can be designed to transmit uplink data without a pre-connection between the eNB and UE or resource allocation for individual UEs. Hereinafter, the above-mentioned resource allocation for uplink transmission is referred to as high-speed uplink resource allocation.

The high-speed uplink resource allocation is characterized as follows: The eNB allocates resources to be shared by a number of UEs, and a UE that needs to transmit urgent data instantaneously transmits uplink data using all or some of the corresponding resources without a separate pre-connection procedure or an additional resource allocation procedure (e.g., without a process for receiving an uplink grant through a PDCCH). Of course, it is impossible to perform optimized scheduling such as general uplink resource allocation, it can be efficiently used by a UE requiring rapid transmission in terms of the time delay.

The pre-connection between the eNB and UE, which is omitted in the high-speed uplink resource allocation, may mean an RRC connection established between the eNB and UE. In this case, the UE may instantaneously transmit data based on a relationship with a specific cell without an RRC connection configuration or reconfiguration procedure, which will be described with reference to FIGS. 7 and 8. Specifically, this may be a UE's camp-on state. In this case, the high-speed uplink resource allocation may include a random access procedure.

For example, when the high-speed uplink resource allocation is performed, a UE requiring resource allocation may perform the random access procedure and then immediately transmit urgent data without performing the RRC connection configuration. In this case, to reduce the time delay further, data can be transmitted during the random access procedure. If the UE transmits a random access preamble and the eNB designates resources used to transmit the PUSCH through a random access response after receiving the random access preamble, the UE may transmit data using the corresponding resources.

Alternatively, the pre-connection between the eNB and UE, which is omitted in the high-speed uplink resource allocation, may mean a connection between a network entity in charge of the network function rather than the eNB and the UE. For example, the pre-connection may include a logical connection between a network entity managing UE mobility and the UE. In this case, the UE that performs the high-speed uplink resource allocation may transmit desired data by performing the minimum communication procedure with the eNB without a process for establishing a connection to the network entity. As an example of the minimum communication procedure, the UE may transmit data without a UL grant through the PDCCH or without the logical connection with the entity immediately after the random access.

However, the high-speed uplink resource allocation has a problem to be solved. That is, it is unknown how many resources are used by the UE to transmit data to the eNB and how much data is transmitted by the UE to the eNB. Specifically, the eNB should know such information to demodulate a corresponding size of a transport block (TB) using the corresponding amount of resources, but in the high-speed uplink resource allocation, the eNB cannot be aware of the amount of information transmitted from each UE. Therefore, the present invention proposes a method for solving this problem.

First, the eNB allocate a series of resources that can be considered by the UE as resources for the high-speed uplink resource allocation. This can be referred to as resource pool allocation. The resource pool allocation can be performed semi-statically using a higher layer signal such as an RRC layer signal, or it can be performed dynamically using a physical layer signal including the PDCCH for the purpose of dynamic resource management. Each UE transmits the PUSCH by selecting resources belonging to a subset of the resource pool.

In this case, if the PUSCH is transmitted using a specific number of RBs, the eNB may additionally designate a TB size which will be used by the UE. For example, the eNB may designate a TB size applied when all RBs included in the resource pool are used. If a specific UE uses some RBs included in the resource pool, the UE may be configured to reduce a corresponding TB size in accordance with a prescribed rule.

For example, if a TB size when all A RBs included in the resource pool are used is B bits, a TB size when a UE uses X RBs, Y may be set to be the maximum one equal to or smaller than B*X/A or the closest one to B*X/A among transmittable TB sizes. As another example, if the minimum RB size allowed in the high-speed uplink resource allocation, C and a TB size used by a UE, D are set, the eNB may set an RB size when the UE uses X RBs, Y to be the maximum one equal to or smaller than D*X/C or the closet one to D*X/C among TB sizes that can be transmitted through the PUSCH. This is because when a TB size transmitted by a single UE is set proportional to the number of RBs, the number of bits transmitted in each RB can be maintained as a constant value, and thus the eNB can consistently maintain demodulation performance even though UEs use different sizes of RBs.

Based on the magnitude of interference in uplink and demodulation success probability of the PUSCH through the high-speed uplink resource allocation, the eNB may determine a TB size used by a UE when the PUSCH is transmitted using a specific number of RBs. In addition, the UE may determine the proper number of RBs and an RB size therefor based on a size of data that the UE should transmit rapidly.

In this case, since if the number of RB sizes that the UE can select is extremely various, number of cases that the eNB should consider in demodulation may be excessively increased, there may be a limitation on the number of RB sizes that the UE can select. For example, when the resource pool is configured with X RBs, the UE may be restricted to select only $X/2^n$ RBs (where n is an integer equal to or greater than 0). Alternatively, the eNB may designate an allowable RB size, and in this case, a TB size (or MCS level) corresponding to each RB size may be designated together.

As another alternative, the eNB may designate I_MCS in the resource pool configuration process, and the UE may determine an RB size according to the traffic status and then determine a TB size using Table 2 above based on the determined RB size, which is determined by itself, and the MCS level designated by the eNB (e.g., I_MCS value). In particular, the resource pool size can be set to equal to the allowable RB size. This could be interpreted to mean that the eNB allocates a specific RB to several UEs and then instruct a UE that needs to be perform actual transmission to transmit the PUDSCH using the corresponding RB.

In addition, the eNB may configure a plurality of resource pools and then determine which UE will use a certain resource pool based on link quality with the eNB (e.g., pathloss or reference signal received power (RSRP)). This is to prevent the following problem. When a signal transmitted from a UE located close to the eNB is received with high power, it may cause significant interference to a signal transmitted from a UE located far away from the eNB because it is received with lower power. In this case, since a resource pool used by the UE close to the eNB has high reception power, higher I_MCS can be used. Similarly, it may be regulated that a smaller number of RBs are used when the same TB size is transmitted.

For example, although the eNB configures three resource pools, i.e., pools 1, 2, and 3, the eNB may set two RSRP thresholds, i.e., th_1, and the_2. Then, the eNB may instruct a UE with RSRP higher than th_1 to use the pool 1, a UE with RSRP between th_1 and th_2 to use the pool 2, and a UE with RSRP lower than th_2 to use the pool 3. In this case, an RB size, I_MCS, and TB size used in each pool may be separately designated, and thus UEs with higher RSRP may be configured to use resources efficiently. Additionally, a method for configuring a different DM-RS sequence depending on RSRP or I_MCS can be considered. In this case, the eNB can distinguish between signals from UEs, which are transmitted with different characteristics, using DM-RSs and thus figure out, through DM-RS sequence detection, which characteristics the UEs perform transmission based on.

In the above-described operation, when a UE uses some RBs in the resource pool, an available RB set may be limited. For example, when the resource pool is composed of X RBs, if a UE uses Y RBs, the X RBs may be divided into X/Y sets, which are consecutive to each other. Thereafter, the UE may be configured to use one of the divided resources. In this case, it is possible to prevent the eNB from having a difficulty in attempting to demodulate all number of cases caused when the number of cases of RB sets used by the UE is extremely increased.

When a UE determines the RB and TB sizes as described above, spectral efficiency of the PUSCH can be maintained. In this case, transmission power of the UE can also be considered such that decoding performance is maintained. Simply, transmission power can be set proportional to the TB size to maintain the transmission power per RB.

However, considering that the maximum transmission power that can be used by the UE to transmit the PUSCH through a specific carrier is limited to a prescribed upper value due to various factors, if the UE does not use a value proportional to the TB size because transmission power used to transmit a large size of TB through large sizes of RBs is limited to the upper value, the eNB cannot achieve a desired level of demodulation performance. Thus, when the UE intends to select the RB and TB sizes as described above, if transmission power according to the selection result is limited to the upper value, the UE cannot select the corresponding RB size, that is, the UE may be configured to select a smaller RB size. In other words, the RB size that the UE can select has a prescribed upper value, and the upper value is deduced from the upper value of the transmission power that can be used by the UE for the PUSCH transmission. To generalize it, assuming that the PUSCH is transmitted according to a specific RB size, if power headroom corresponding to the remaining transmission power except the transmission power therefor is lower than a predetermined level, the UE is not allowed to perform the transmission based on the corresponding RB size, that is, the UE may be configured to perform transmission using a smaller RB size.

If a different UE transmits the PUSCH using a different RB size, the eNB should explicitly indicate that response to the PUSCH (e.g., information on whether the PUSCH is successfully received or information on whether retransmission is instructed) is for which UE. This will be described by taking as an example a PHICH corresponding to a signal in response to the PUSCH of the LTE system.

In general, a corresponding PHICH resource is determined by the lowest RB index and an RS sequence parameter (CS value or OCC) used for the PUSCH transmission. If the two UEs use the same lowest RB index but use different RB sizes, RSs can be distinguished because an RS sequence is changed according to an RB size. However, considering that the PHICH can be distinguished using only the OCC and CS, if the eNB successfully receives only a PUSCH transmitted from one of the two UE, PHICH resources for the two UEs should be separated to properly transmit information on the successful reception to the UEs.

As one method for PHICH resource separation, a PHICH resource corresponding to a PUSCH having the same lowest RB index but different RS sequence parameters can be utilized. That is, a series of PHICH resource candidates are determined as the lowest RB index, and then one of the candidates is finally determined from an RB size that is actually used by a UE. Further, a UE using a different RB size may be configured to use a different RS sequence parameter for the PUSCH transmission, and in this case, the PHISCH resource can be determined from the RS sequence parameter used by the UE.

The eNB may use an uplink grant or PDSCH as the response to the PUSCH, and in this case, the amount of transmitted information may be increased. That is, the lowest RB index, RB size, and/or RS sequence parameter used by the UE are included in the uplink grant or PDSCH. By doing so, the eNB may inform that the uplink grant or PDSCH is for the UE that transmits the PUSCH. Although such information may be explicitly included in the uplink grant or PDSCH, some or all of the corresponding information can be used as information for generating a CRC mask of DL assignment information that schedules the uplink grant or PDSCH. Thus, the UE can identify response from the eNB that is valid for the corresponding UE by demodulating the uplink grant or DL assignment information to which the CRC mask corresponding to its PUSCH transmission is applied.

In performing the above-described operation, if a message greater than a resource that can be used by the UE is in a buffer, success probability is extremely low even though the message is transmitted with a limited resource. In addition, it may act as interference to a signal for another UE transmitted on the same resources. In this case, the UE may be configured not to use the configured high-speed uplink transmission resource to prevent the interference to the signal for another UE.

If a message greater by a predetermined level than the message capable of being transmitted using the maximum resource size that can be selected by the UE is in the buffer, the above-mentioned operation can be performed. Of course, when the size of the resource that can be used by the UE and/or the size of the transmission message is fixed, if a message greater by the predetermined level than the fixed size is in the buffer, the operation can be performed. In this case, the corresponding UE may inform the eNB that the UE requires more resources by transmitting a separate signal to the eNB and then be allocated resources dedicated to the corresponding UE. Alternatively, the UE may be configured to divide the entire message into two or more packets, enable each packet to be transmitted using the maximum resource size or an allowed resource size smaller than the maximum resource size, and transmit a series of the packets.

Of course, in this case, the corresponding UE may be configured to transmit only a DM-RS through high-speed uplink resources. At this time, the eNB may know that the corresponding UE requires uplink transmission irrespective of types by detecting the DM-RS and then take proper action. For example, the eNB may be configured to instruct the corresponding UE to transmit a message stored in the UE's buffer by transmitting an uplink grant through the PDCCH or instruct the UE to report the amount of data stored in the UE's buffer. It could be interpreted to mean that the DM-RS on the high-speed uplink resources is used as a scheduling request (SR) for uplink, that is, that the SR is transmitted through the high-speed uplink resources instead of the PUCCH. As another example, the eNB may allocate uplink resources to the corresponding UE through the PDCCH and the PDSCH scheduled thereby and then instruct the corresponding UE to perform the similar operation.

In general, a DM-RS sequence has a CS or OCC value different from that applied to a given base sequence. In addition, it can be identified and detected by the eNB when a different UE performs transmission. Even when a plurality of UEs transmit DM-RSs on the same resources, the above-described operation can be performed. To smooth the operation, the eNB may designate which DM-RS sequence will be used by each UE on high-speed uplink transmission resources in advance. By doing so, the eNB can figure out which UE requires uplink transmission by detecting the DM-RS sequence. In this case, if the DM-RS sequence to be used by the UE is determined, follow-up operation can be performed in the same manner as when a sequence is determined according to the RB size as described above.

The above-described operation in which only the DM-RS is used as the SR without data can be distinguished from the high-speed uplink transmission. This is because a number of UEs can simultaneously perform DM-RS transmission on a single resource. More specifically, the DM-RS transmission may be regulated to be performed with high probability. For example, when a UE intends to perform the high-speed uplink transmission and when the UE performs random backoff, if the UE performs the DM-RS transmission only, an initial value of the random backoff may be regulated to be in a relatively narrow range. Therefore, the DM-RS transmission can be performed more rapidly.

As a modification of the principle of using a DM-RS on PUSCH resources shared by other UEs as the SR, a UE can transmit data through the corresponding PUSCH resources and use the resources as means of informing whether additional resources are required (or whether the amount of data stored in a buffer is equal to or greater than a predetermined amount). For example, a UE may be allocated two DM-RS sequences, i.e., sequences 1 and 2. If all data is able to be transmitted through high-speed uplink resources, the UE can use the sequence 1 as the DM-RS. On the other hand, if there is remaining data to be transmitted through additional resource allocation, the UE can use the sequence 2 as the DM-RS. If the UE operates as described above, the eNB can detect the DM-RS from the first transmission and immediately figure out whether the UE requires the addition resource allocation. Thereafter, the eNB can allow the UE to transmit all data in the buffer rapidly by allocating the required resources instantaneously.

For example, when a buffer size remaining after uplink data transmission is included in a prescribed message and then reported, the eNB cannot know whether addition resources are required until the eNB successfully receives the initial message containing the buffer size. In this case, although an additional time delay may occur, such a problem can be solved by transmitting the DM-RS using the sequence 2.

In the above-described operation, although the buffer may include the entirety of a UE's uplink data buffer, it may mean a buffer for storing data generated for some services which need to be rapidly transmitted.

Figure 7:
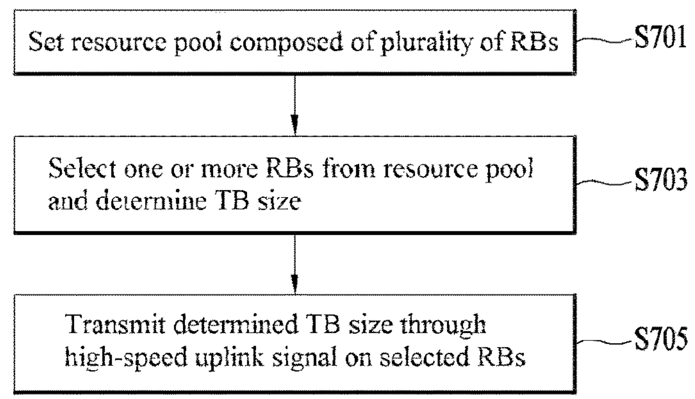
FIG. 7 is a diagram illustrating an example of a method for determining a transport block size according to an embodiment of the present invention.

FIG. 7 is a diagram illustrating an example of a method for determining a transport block size according to an embodiment of the present invention.

Referring to FIG. 7, in step 701, a UE sets a plurality of RBs as a resource pool for transmitting a high-speed uplink signal through a higher layer signal such as RRC layer signaling.

Next, in step 703, the UE selects one or more RBs from the resource pool. In particular, to this end, the number of RBs that can be selected from the resource pool may be separately configured through the higher layer signal. For example, when the resource pool is composed of X RBs, the UE may be configured to select only X/2n RBs (where n is an integer equal to or greater than 0). Preferably, the one or more RBs may be selected based on channel quality between the UE and an eNB.

In this case, the TB size may be determined based on the number of the selected RBs. For example, a ratio of the TB size to the maximum TB size corresponding to the resource pool may correspond to a ratio of the number of the selected RBs to the number of RBs included in the resource pool, and then the TB size may be determined.

Last, in step 705, the UE transmits the high-speed uplink signal including a TB to the eNB on the selected RBs. In this case, the maximum transmission power of the high-speed uplink signal is determined based on the number of the selected RBs. Preferably, a response signal may be received from the eNB in response to the high-speed uplink signal, and similarly, resources for receiving the response signal may also be determined based on the number of the selected RBs.

Figure 8:
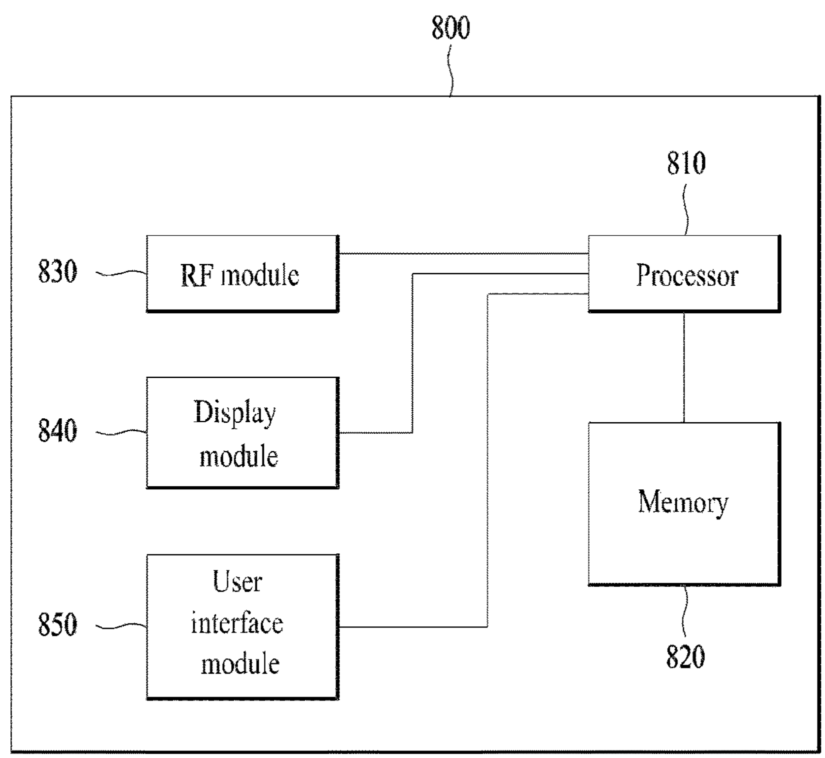
FIG. 8 is a block diagram of a communication apparatus according to an embodiment of the present invention.

FIG. 8 is a block diagram of a communication apparatus according to an embodiment of the present invention.

Referring to FIG. 8, a communication apparatus 800 includes a processor 810, a memory 820, an RF module 830, a display module 840, and a User Interface (UI) module 850.

The communication device 800 is shown as having the configuration illustrated in FIG. 8, for the convenience of description. Some modules may be added to or omitted from the communication apparatus 800. In addition, a module of the communication apparatus 800 may be divided into more modules. The processor 810 is configured to perform operations according to the embodiments of the present invention described before with reference to the drawings. Specifically, for detailed operations of the processor 810, the descriptions of FIGS. 1 to 7 may be referred to.

The memory 820 is connected to the processor 810 and stores an Operating System (OS), applications, program codes, data, etc. The RF module 830, which is connected to the processor 810, upconverts a baseband signal to an RF signal or downconverts an RF signal to a baseband signal. For this purpose, the RF module 830 performs digital-to-analog conversion, amplification, filtering, and frequency upconversion or performs these processes reversely. The display module 840 is connected to the processor 810 and displays various types of information. The display module 840 may be configured as, not limited to, a known component such as a Liquid Crystal Display (LCD), a Light Emitting Diode (LED) display, and an Organic Light Emitting Diode (OLED) display. The UI module 850 is connected to the processor 810 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method for determining a transport block size of an uplink signal in a wireless communication system and apparatus therefor are mainly described with reference to examples applied to the 3GPP LTE system, the method and apparatus can be applied to various wireless communication systems as well as the 3GPP LTE system.

What is claimed is:

1. A method for transmitting a high-speed uplink signal to an evolved node B (eNB) by a user equipment (UE) in a wireless communication system, the method comprising:

setting a plurality of resource blocks (RBs) as a resource pool for transmitting the high-speed uplink signal through a higher layer signal;

selecting one or more RBs from the resource pool;

transmitting, to the eNB, the high-speed uplink signal including a transport block (TB) on the selected one or more RBs without receiving an uplink grant from the eNB; and receiving, from the eNB, a response signal in response to the high-speed uplink signal, wherein a size of the TB and resources for receiving the response signal are determined based on a number of the selected one or more RBs.

2. The method of claim 1, further comprising setting a number of RBs that can be selected from the resource pool through the higher layer signal.

3. The method of claim 1, wherein maximum transmission power of the high-speed uplink signal is determined based on the number of the selected one or more RBs.

4. The method of claim 1, wherein the one or more RBs are selected based on a channel quality between the UE and the eNB.

5. The method of claim 1, wherein a ratio of the size of the TB to a maximum TB size corresponding to the resource pool corresponds to a ratio of the number of the selected one or more RBs to a number of RBs included in the resource pool.

6. A user equipment (UE) in a wireless communication system, the UE comprising:

a wireless communication unit configured to transmit and receive signals through a network; and a processor configured to process the signals, wherein the processor is configured to set a plurality of resource blocks (RBs) as a resource pool for transmitting a high-speed uplink signal through a higher layer signal, select one or more RBs from the resource pool, control the wireless communication unit to transmit the high-speed uplink signal including a transport block (TB) on the selected one or more RBs to an evolved node B (eNB) without receiving an uplink grant from the eNB, and receive a response signal in response to the high-speed uplink signal from the eNB, and wherein a size of the TB and resources for receiving the response signal are determined based on a number of the selected one or more RBs.

7. The UE of claim 6, wherein the processor is configured to set a number of RBs that can be selected from the resource pool through the higher layer signal.

8. The UE of claim 6, wherein the processor is configured to determine maximum transmission power of the high-speed uplink signal based on the number of the selected one or more RBs.

9. The UE of claim 6, wherein the processor is configured to select the one or more RBs based on a channel quality between the UE and the eNB.

10. The UE of claim 6, wherein a ratio of the size of the TB to a maximum TB size corresponding to the resource pool corresponds to a ratio of the number of the selected one or more RBs to a number of RBs included in the resource pool.

* * * * *